(12) United States Patent
Yankun et al.

(10) Patent No.: US 8,611,598 B2
(45) Date of Patent: Dec. 17, 2013

(54) VEHICLE OBSTACLE DETECTION SYSTEM

(75) Inventors: Zhang Yankun, Shanghai (CN); Hong Chuyang, Shanghai (CN); Norman Weyrich, Shanghai (CN)

(73) Assignee: Harman International (China) Holdings Co., Ltd., Shanghai (CN)

( * ) Notice: Subject to any disclaimer, the term of this patent is extended or adjusted under 35 U.S.C. 154(b) by 251 days.

(21) Appl. No.: 13/191,308

(22) Filed: Jul. 26, 2011

(65) Prior Publication Data

US 2013/0027196 A1  Jan. 31, 2013

(51) Int. Cl.
*G06K 9/00* (2006.01)
(52) U.S. Cl.
USPC .......................................................... 382/103
(58) Field of Classification Search
None
See application file for complete search history.

(56) References Cited

U.S. PATENT DOCUMENTS

| | | | |
|---|---|---|---|
| 2007/0115357 A1* | 5/2007 | Stein et al. | 348/148 |
| 2007/0255480 A1* | 11/2007 | Southall et al. | 701/96 |
| 2008/0304705 A1* | 12/2008 | Pomerleau et al. | 382/103 |
| 2009/0141938 A1* | 6/2009 | Lim et al. | 382/103 |
| 2010/0098327 A1* | 4/2010 | Se et al. | 382/154 |
| 2012/0070071 A1* | 3/2012 | Rankin et al. | 382/154 |

OTHER PUBLICATIONS

Sharon, E.; Brandt, A.; Basri, R., "Segmentation and boundary detection using multiscale intensity measurements," Computer Vision and Pattern Recognition, 2001. CVPR 2001. Proceedings of the 2001 IEEE Computer Society Conference on , vol. 1, No., pp. I-469,I-476 vol. 1, 2001.*
Yang et al., "A New Approach for In-Vehicle Camera Obstacle Detection by Ground Movement Compensation," Proceedings of the 11th International IEEE Conference on Intelligent Tr.
Ma et al., "A Real-Time Rear View Camera Based Obstacle Detection," Proceedings of the 12th International IEEE Conference on Intelligent Transportation Systems, St. Louis, MO.
Suhr et al., "Automatic free parking space detection by using motion stereo-based 3D reconstruction," Machine Vision and Applications (2010) 21:163-176.
Vestri et al., "Real-Time Monocular 3D Vision System," IMRA 'Europe 220, rue Albert-Caquot 06904 Sophia-Antipolis France.

* cited by examiner

*Primary Examiner* — Nirav G Patel
(74) *Attorney, Agent, or Firm* — Alleman Hall McCoy Russell & Tuttle LLP

(57) ABSTRACT

A computer-implemented method of detecting objects in a path of a vehicle is provided. An image frame that depicts the path of the vehicle is obtained. An edge-image corresponding to the image frame is generated. A binary image corresponding to the edge-image is also generated. One or more blobs in the binary image that respectively correspond to one or more objects in the image frame are identified. Based on an analysis of the blobs in the binary image, a determination is made that one of the objects in the image frame is an obstacle in the path of the vehicle.

20 Claims, 12 Drawing Sheets

US 8,611,598 B2

VEHICLE OBSTACLE DETECTION SYSTEM

FIELD OF THE INVENTION

This invention relates to obstacle detection systems and in particular to camera-based obstacle detection systems.

BACKGROUND

Vehicle systems developers continue to innovate in the field of vehicle safety systems. One type of vehicle safety system alerts drivers to obstacles in the surrounding environment. Referred to as obstacle detection systems, these safety systems detect obstacles in the vehicle's forward or reverse path of movement. Obstacles may be, for example, pedestrians, bicycles, road blocks, other cars, etc.

Obstacle detection systems monitor the road in front of or behind a vehicle while the vehicle is moving. If the vehicle approaches an object, an obstacle detection system identifies the object as an obstacle and warns the driver of its presence. Alerted to the presence of the obstacle, the driver may then take precautions to avoid the obstacle. Accordingly, obstacle detection systems can reduce the risk of collisions with an obstacle thereby improving vehicle safety.

Known obstacle detection systems may operate using radar, ultrasonic sensors, or cameras to monitor the proximity of objects to a vehicle. Conventional camera-based obstacle detection systems capture and analyze a sequence of images to detect objects and identify obstacles in the path of a vehicle. The process of analyzing the image sequence, however, may be computationally complex and may require supplemental information such as, for example, motion parameters obtained from vehicle sensors. As a result, known camera-based obstacle detection systems may require relatively more hardware resources and processing time.

Therefore, a need exists for a simplified approach to detecting objects and identifying obstacles in a path of a vehicle.

SUMMARY

A computer-implemented method of detecting objects in a path of a vehicle is provided. An image frame that depicts the path of the vehicle is obtained. An edge-image corresponding to the image frame is generated. A binary image corresponding to the edge-image is also generated. One or more blobs in the binary image that respectively correspond to one or more objects in the image frame are identified. Based on an analysis of the blobs in the binary image, a determination is made that one of the objects in the image frame is an obstacle in the path of the vehicle.

A system for detecting objects in a path of a vehicle is also provided. An image segmentation module generates an edge-image corresponding to an image frame that depicts the path of the vehicle. A binary image creation module generates a binary image corresponding to the edge-image. A blob analysis module identifies one or more blobs in the binary image that respectively correspond to one or more objects in the image frame. An obstacle verification module determines, based on an analysis of the blobs in the binary image, that one of the objects in the image frame is an obstacle in the path of the vehicle.

DETAILED DESCRIPTION

A system and method for detecting obstacles in the path of a vehicle are provided. The system detects objects and identifies obstacles based on an image frame of the path of movement for a vehicle. The system performs an edge-detection process on the image frame to produce an edge-image that indicates the edges of the objects in the image frame. As used in this application, edge-image refers to an image that includes a set of lines that indicate the respective boundaries, surface markings, or surface contours of objects in an image frame such as, for example, a digital photograph. The system then converts the edge-image into a binary image in which the objects of the image frame are depicted as blobs in the binary image. A binary image is a digital image in which a pixel may be one of two values, e.g., 0 or 1, which may correspond, for example, to black and white respectively (although any two colors may be used). Blob, as used in this application, refers to a region of the binary image that is brighter (or darker) than the surrounding area, i.e., a subset of adjacent or proximal pixels in the digital image that may be considered as a singular component in the binary image. A clustered group of connected white pixels in a black-and-white binary image is one example of a blob.

The system then performs morphological operations on the binary image to identify blobs of interest that may correspond to obstacles in the path of a vehicle. For each object blob of interest, the system determines an ellipse that encloses the blob. The system then confirms which objects are obstacles in the path of the vehicle by prolongating the ellipses and comparing the ellipse prolongations to the focus of the image. This process will be discussed in further detail below. If the system detects an obstacle, the system may generate a warning signal that can be presented to a driver thus alerting the driver to the presence of the obstacle. The system detects objects and identifies obstacles using a single image frame and without using motion parameters (e.g., the speed of the vehicle) obtained from vehicle sensors.

Figure 1:
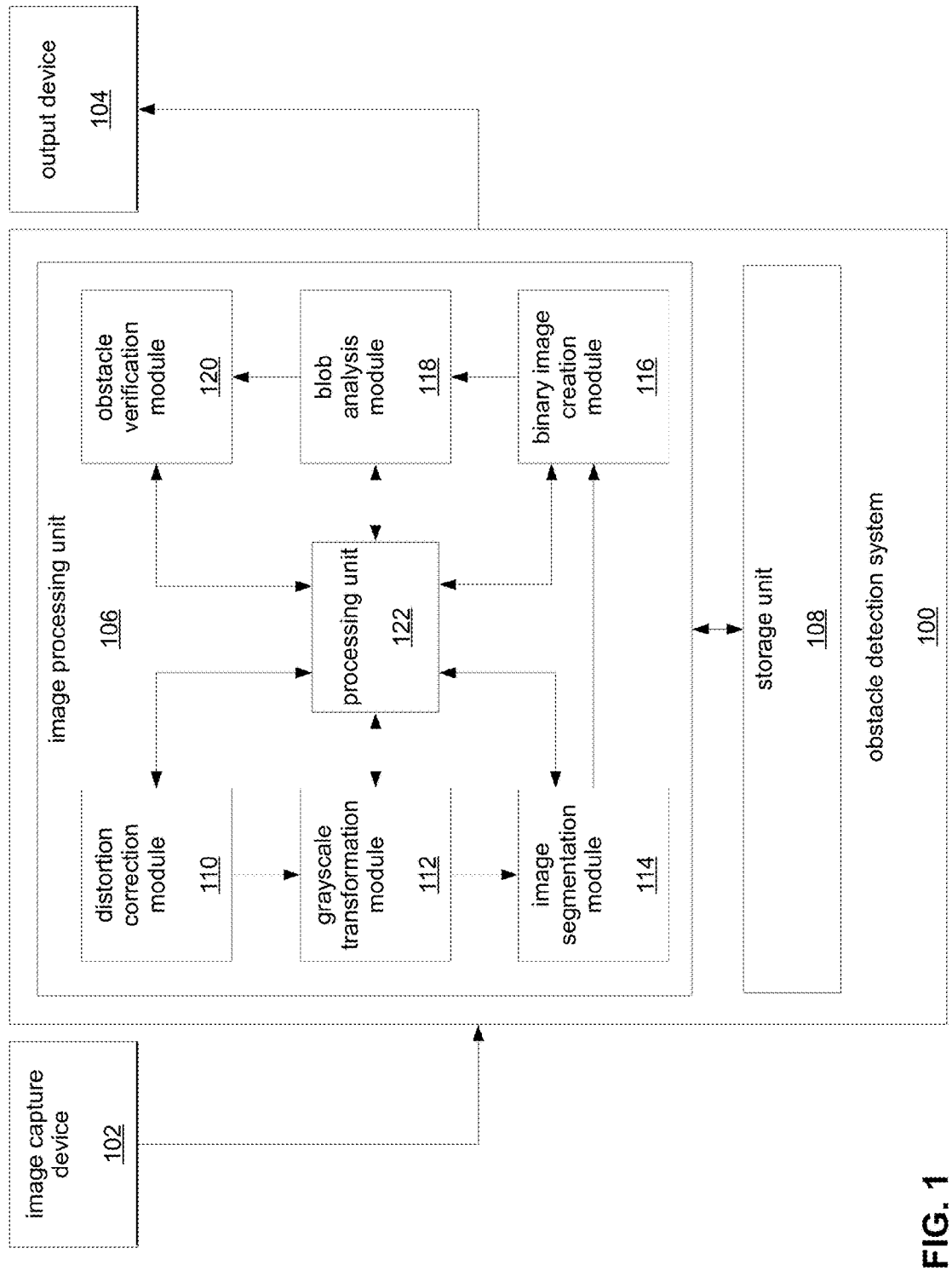
FIG. 1 is a schematic diagram of an example of an implementation of an obstacle detection system.

Referring to FIG. 1, an example of an implementation of an obstacle detection system 100 for detecting and identifying obstacles in a path of a vehicle is shown. The obstacle detection system 100 is in signal communication with an image capture device 102 and an output device 104. The image capture device 102 captures images of the path of the vehicle. The output device 104 may be used to alert the driver to the presence of an obstacle in the path of the vehicle. The obstacle detection system 100 includes an image processing unit 106 and a storage unit 108 in signal communication with the image processing unit. The image processing unit 106 processes images captured by the image capture device 102 in order to detect and identify obstacles in the path of the vehicle. The storage unit 108, in this example, may be utilized during the obstacle detection and identification process to store the images and image processing information.

The image capture device 102 may be any device configured to capture video images or photographic images and convert the images to an electronic signal. For example, the image capture device 102 may be a digital camera that generates digital images of the path of the vehicle. The image capture device 102 may be mounted to the front or rear of a vehicle. In this way, the image capture device 102 may capture images of the path of a vehicle both in front of and behind the vehicle. Accordingly, the obstacle detection system 100 may detect obstacles in the path of the vehicle while the vehicle is moving forward or in reverse. The images captured by the image capture device 102 may be either in color or in grayscale. In the example shown, the obstacle detection system 100 is configured to process grayscale images as discussed further below.

The output device 104 may be any device configured to alert a driver to the presence of an obstacle in the path of a vehicle in response to receipt of a warning signal. For example, the output device 104 may be, for example, speakers of a vehicle audio system, speakers of an infotainment unit installed in the vehicle, and the like. The output device 104 may also be, for example, a visual device that visually alters the driver to the presence of an obstacle using, e.g., flashing lights or a visual display. The output device 104 may also be, for example, a tactile device that provides a tactile warning to the driver, e.g., a vibrating element in the steering wheel or seat.

The obstacle detection system 100 in FIG. 1 includes an image processing unit 106 and a storage unit 108. The storage unit 108 may store the images captured by the image capture device 102 as well as other information and intermediate images generated during the obstacle identification and detection process. As elaborated further below, the storage unit 108 may be any suitable computer-readable storage medium.

The image processing unit 106, in this example, includes various modules 110-120 for identifying objects and detecting obstacles in an image frame of a path of a vehicle. The modules 110-120 in the example of FIG. 1 are in signal communication with a processing unit 122 that executes instructions provided by the modules to detect and identify obstacles. The processing unit 122 may be any suitable processing module configured to execute instructions or code such as, for example, a central processing unit (CPU), microcontroller unit (MCU), graphics processing unit (GPU), and the like as elaborated on below.

In the example shown, the modules 110-120 of the image processing unit 106 include: a distortion correction module 110 to correct any distortion in the image frame; a grayscale transformation module 112 to transform a color image frame into a grayscale image frame; an image segmentation module 114 to generate an edge-image from the image frame; an binary image creation module 116 to create a binary image from the edge-image; a blob analysis module 118 to identify blobs in the binary image as potential obstacles; and an obstacle verification module 120 to verify that potential obstacles are actual obstacles in the path of the vehicle. The image processing modules 110-120 will be discussed below with additional reference to FIGS. 2A-F, which show the results of the image processing at each stage.

The obstacle detection system 100 receives an image frame from the image capture device 102. In some circumstances, the image frame may include distortions resulting from the lens of the image capture device 102. Where lens distortion occurs, vertical edges of an object in the image frame may not appear truly vertical in the image frame due to the lens distortion. The object detection system 100, in this example, is configured to detect objects that rise up from the road surface, i.e., objects having vertical edges that are relatively perpendicular to the road surface. As a result, the obstacle detection system 100 includes a distortion correction module 110 to correct any distortion to the vertical edges caused by the lens of the image capture device 102. The distortion correction module 110 corrects any distortion using distortion correction coefficients associated with the image capture device 102. The distortion correction coefficients may be derived using conventional calibration methods.

For a pinhole camera model, for example, distortion coefficients may be solved using equations for a projection of three-dimensional (3D) coordinates onto a two-dimensional (2D) image plane that is fixed with respect to the camera. The following perspective transformation may be used to project 3D coordinates (x, y, z) onto an image plane:

$$\begin{bmatrix} x \\ y \\ z \end{bmatrix} = \begin{bmatrix} X \\ R \times Y | t \\ Z \end{bmatrix},$$

where (X, Y, Z) are 3D coordinates of a point in the three-dimensional space. The corresponding feature points (u, v) in the image plane may be given by the following equations: $u=f_x x'|c_x$ and $v=f_y y+c_x$. In these equations, $f_x$ and $f_y$ are focal lengths in pixel-related units; $(c_x, c_y)$ is a principal point such as, for example, the center of the image; and $x'=x/z$ and $y'=y/z$.

Radial distortion and tangential distortion are two types of lens distortion that may occur. To account for radial and tangential distortion, the equations above may be modified to include radial distortion coefficients and tangential distortion coefficients. Where $k_1$ and $k_2$ are radial distortion coefficients and $p_1$ and $p_2$ are tangential distortion coefficients, the following example equations may be used for the perspective transformation of the 3D points onto a 2D image plane: $u=f_x x'^1+c_x$ and $v=f_y y'^1|c_x$. In these equations, $$x'^1=x'(1+k_1 r^2+k_2 r^4)+2p_1 x'y'+p_2(r^2-2x'^2);$$

$$y'^1=y'(1+k_1 r^2+k_2 r^4)+p_1(r^2+2y^2)+2p_2 x'y'; r^2=x'^2+y'^2;$$
$$x'=x/z; \text{ and } y'=y/z.$$

If the 3D coordinates (x, y, z) and the corresponding features points (u, v) are known, one can solve for the distortion coefficients, $(k_1, k_2)$ and $(p_1, p_2)$, in the example equations. Three-dimensional points and corresponding feature points in the image plane may be obtained, for example, by capturing an image of a black-and-white chessboard in a three-dimensional space, and determining which 3D points correspond to feature points (e.g., the corners in the chessboard) in the image plane.

Figure 2A:
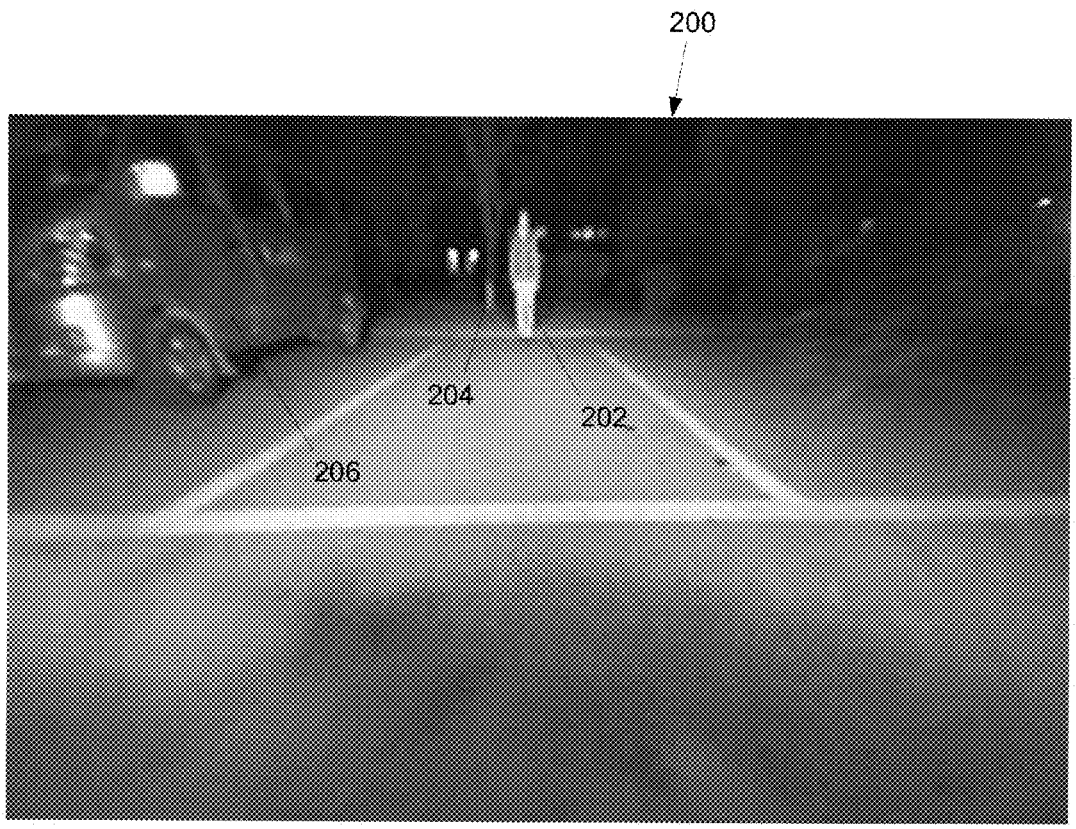
FIG. 2A is an example of a grayscale image of a path of a vehicle that may be processed to detect obstacles in the path of a vehicle.

The obstacle detection system 110, in the example shown, is also configured to process grayscale image frames of the path of the vehicle. In some circumstances, the image capture device 102 may provide the image frames to the obstacle detection system 100 as color image frames. As a result, the obstacle detection system 100 in FIG. 1 includes a grayscale transformation module 112 to transform the color image frame into a grayscale image frame. It will be understood that the grayscale transformation module 112 may convert the original color image frame to a grayscale image frame or, alternatively, generate a new grayscale image frame that corresponds to the color image frame. As used in this application, a grayscale image is a monochromatic (e.g., black-and-white) image composed of various shades of gray. The grayscale transformation module 112 removes the color from the color image frame by converting the chromatic pixel information into intensity pixel information (e.g., 0-1, where 0 represents all black, 1 represents all white, and values between 0 and 1 correspond to various shades of gray) thus transforming the color image frame into a grayscale image frame. Once the obstacle detection system 100 has obtained a grayscale image frame of the path of the vehicle, the obstacle detection system may process the grayscale image to identify objects and detect obstacles in the image. FIG. 2A is an example grayscale image frame 200 corrected for any lens distortion. As seen in the example image frame 200, a pedestrian 202, a tree 204, and a van 206 are in the image frame and represent potential obstacles in the path of the vehicle.

Figure 3:
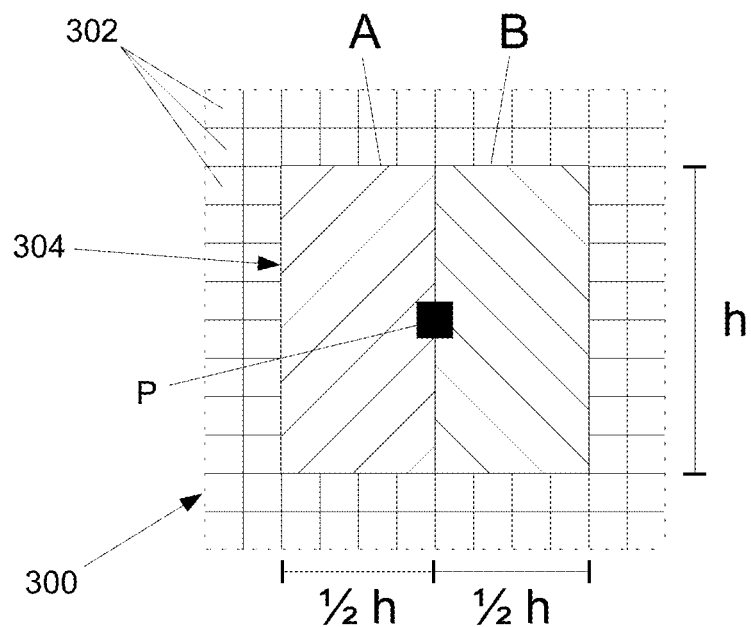
FIG. 3 is a representation of an image during the image segmentation process.

The obstacle detection system 100 first converts the grayscale image 200 into an edge-image using the image segmentation module 114. The image segmentation module 114 performs a multi-scale integral image-based segmentation of the grayscale image frame 200. With reference to FIG. 3, the image 300, in this example, is a two-dimensional grid of pixels 302. For each pixel, P, in the image 300, the image segmentation module 114 centers a square 304 having a height and width, h, around the pixel, P. The image segmentation module 114 divides the h×h square 304 into two rectangles, rectangle A and rectangle B as seen in FIG. 3. Each rectangle has a height, h, and a width ½h. Further, rectangle A and rectangle B may correspond to an (x, y) coordinate system such that pixels in each rectangle may be described by an (x', y') coordinate pair. Accordingly, coordinate x corresponds to a point in a rectangle along its width having a maximum value of ½h, and coordinate y corresponds to a point in the rectangle along its height having a maximum value of h. In the circumstance where the pixel, P, is near the border of the image such that the square 304 falls outside of the image boundary, the corresponding pixel in the edge image may be set to zero in some implementations.

The image segmentation module 114 computes the sum, $S_A$, of the values for every pixel in rectangle A and the sum, $S_B$, of the values for every pixel in rectangle B. It will be understood that the grayscale image frame 200 may have a pixel mapping where the pixel coordinates increase from left to right (along the horizontal x-axis) and from top to bottom (along the vertical y-axis); however, other conventions may be selectively employed.

The following formulas may be used to calculate the sum of the values in rectangle A and rectangle B:

$$S_A = \sum_{\substack{x' \leq x \\ y' \leq y}} a(x', y') \quad \text{(Eq. 1)}$$

$$S_B = \sum_{\substack{x' \leq x \\ y' \leq y}} b(x', y') \quad \text{(Eq. 2)}$$

where (x, y) represents the bottom-right corner of the rectangle in the grayscale image frame, a(x', y') corresponds to the pixels in rectangle A, and b(x', y') corresponds to the pixels in rectangle B.

The image segmentation module 114 may calculate the sum of the pixel values, $S_A$ and $S_B$, using an integral image (also known as a summed area table). The integral image may be used to quickly calculate the sum of a rectangular subset of values in a grid of values. Accordingly, this approach may be employed to quickly calculate the sum of the pixel values in rectangle A and rectangle B. The integral image, in this example, is a two-dimensional grid (or table) that corresponds to the grayscale image frame 200. Each point (x, y) in the integral image is the sum of all pixel values above and to the left of the pixel at point (x, y) in the grayscale image including the value of the pixel itself.

The image segmentation module may generate the integral image from a single iteration over the pixel mapping of the grayscale image frame. The following formula may be used to calculate the value of each point in the integral image based on the grayscale image frame 200:

$$I(x,y) = i(x,y) + I(x-1,y) + I(x,y-1) + I(x-1,y-1) \quad \text{(Eq. 3)}$$

where i(x, y) is the value of the pixel at coordinate (x, y) in the grayscale image frame and I(x, y) is the sum of the pixel values (inclusive) above and to the left of the pixel at (x, y) in the grayscale image frame.

Once the image segmentation module 114 has generated the integral image, calculating the sum of the pixels in any rectangle A and rectangle B in the grayscale image frame may be quickly determined using the integral image and four references—$R_1$, $R_2$, $R_3$, and $R_4$,—for a rectangle of interest. The four references correspond to the coordinates of the corners of the rectangle of interest. In this example, $R_1$ corresponds to the top-left corner (x1, y1) of the rectangle of interest; $R_2$ corresponds to the top-right corner (x2, y2); $R_3$ corresponds to the bottom-right corner (x3, y3); and $R_4$ corresponds to the bottom-left corner (x4, y4). Using these four reference points for the rectangle of interest, the image segmentation module may calculate the sum of the pixels, $S_R$, for the rectangle with the integral image using the following formula:

$$S_R = I(R_1) + I(R_3) - I(R_2) - I(R_4) \quad \text{(Eq. 4)}$$

This corresponds to the following formula when the coordinates for the reference points are substituted:

$$S_R = I(x_1, y_1) + I(x_3, y_3) - I(x_2, y_2) - I(x_4, y_4) \quad \text{(Eq. 5)}$$

Using this integral image approach, the image segmentation module 114 may generate an integral image for the grayscale image frame and quickly calculate the sum of the pixel values, $S_A$ and $S_B$, for any rectangle A and rectangle B using the respective formulas:

$$S_A = I(x_{A1}, y_{A1}) + I(x_{A3}, y_{A3}) - I(x_{A2}, y_{A2}) - I(x_{A4}, y_{A4}) \quad \text{(Eq. 6)}$$

$$S_B = I(x_{B1}, y_{B1}) + I(x_{B3}, y_{B3}) - I(x_{B2}, y_{B2}) - I(x_{B4}, y_{B4}) \quad \text{(Eq. 7)}$$

where $(x_{A1}, y_{A1})$, $(x_{A2}, y_{A2})$, etc. and $(x_{B1}, y_{B1})$, $(x_{B2}, y_{B2})$, etc. respectively correspond to the reference points (i.e., corners) for rectangle A and rectangle B.

Once the image segmentation module 114 has calculated the sum of the pixels in rectangle A and rectangle B, the image segmentation module calculates the mean pixel value, $\mu_A$, for rectangle A and the mean pixel value, $\mu_B$, for rectangle B. The following formulas may be used:

$$\mu_A = \frac{S_A}{n_A} \qquad \text{(Eq. 8)}$$

$$\mu_B = \frac{S_B}{n_B} \qquad \text{(Eq. 9)}$$

where $n_A$ is the total number of pixels in rectangle A and $n_B$ is the total number of pixels in rectangle B.

The image segmentation module 114 uses the mean pixel values, $\mu_A$ and $\mu_B$, to calculate the absolute difference, r, of the mean pixel values. The following formula may be used to calculate the absolute difference, r:

$$r = |\mu_A - \mu_B| \qquad \text{(Eq. 10)}$$

The image segmentation module 114 also uses the mean pixel values, $\mu_A$ and $\mu_B$, to determine a threshold value, T, which may be calculated using the following function:

$$T = \lambda \times \frac{(\mu_A + \mu_B)}{2} \qquad \text{(Eq. 11)}$$

where $\lambda$ is a constant coefficient that may be set to a predetermined value based on a desired size of the edge region in the edge image. The value of the constant coefficient, $\lambda$, corresponds and is proportional to the size of the edge region in the edge image. In some implementations, for example, the constant coefficient, $\lambda$, may be between around 0.20-0.35. When $\lambda$ is relatively large (e.g., around 0.35), the edge-image may exhibit relatively smaller edge regions, and some objects in the image may be missed. Correspondingly, when $\lambda$ is relatively small (e.g., around 0.20), the edge-image will exhibit relatively larger edge regions and false positives may result such as, for example, paint or text on the road surface. A suitable range for the constant coefficient, $\lambda$, in this is example may be around 0.27-0.32.

As mentioned above, the image segmentation module 114 performs a multi-scale image-based segmentation of the grayscale image frame 200. Each pixel in the grayscale image frame 200 is processed according to the steps described above multiple times at varying scales. The scale, k, refers to the height, h, of the rectangle used during the image segmentation process. Accordingly, the scale, k, also corresponds to the absolute difference of mean pixel value, $r_k$, and the threshold, $T_k$. In this example, the image segmentation module 114 may conduct a three-scale image segmentation of the grayscale image frame 200 where k=4, k=6, and k=8. Accordingly, the image segmentation module 114 performs the image segmentation of the grayscale image frame 200 with rectangles having respective heights, h=4, h=6, and h=8. Further, the image segmentation module 114 calculates corresponding absolute differences in mean pixel value—$r_4$, $r_6$, and $r_8$—and corresponding thresholds—$T_4$, $T_6$, and $T_8$. The object detection system 100, in this example, performs image segmentation at multiple scales using rectangles having different sizes in order to identify objects in the image frame 200 that may be different sizes. It will be understood that the object detection system 100 may be selectively configured to use additional or alternative scales with rectangles having additional or alternative sizes.

Also mentioned above, the image segmentation module 114 processes the grayscale image frame 200 to generate an edge-image. The image segmentation module 114 determines the value, $P_{out}$, for a pixel in the edge-image by comparing the absolute difference in mean pixel value, $r_k$, for each scale, to the threshold, $T_k$, at that scale, and setting $P_{out}$ to the highest value for $r_k$. $P_{out}$ may be represented as the edge response. The image segmentation module 114 compares the absolute difference in mean pixel value, $r_k$, to the threshold, $T_k$, and sets $r_k$ to zero if the absolute difference in mean pixel value is below the threshold. The following piecewise formula may be used:

$$r_k = \begin{cases} r_k, & \text{if } r_k > T_k; \\ 0, & \text{if } r_k \leq T_k \end{cases} \qquad \text{(Eq. 12)}$$

Once the image segmentation module 114 has obtained values for $r_k$ at each desired scale (e.g., $r_4$, $r_6$, $r_8$), the image segmentation module sets the value of $P_{out}$ to the maximum value of $r_k$. The following formula may be used:

$$P_{out} = \text{MAX}(r_k) \qquad \text{(Eq. 13)}$$

Figure 2B:
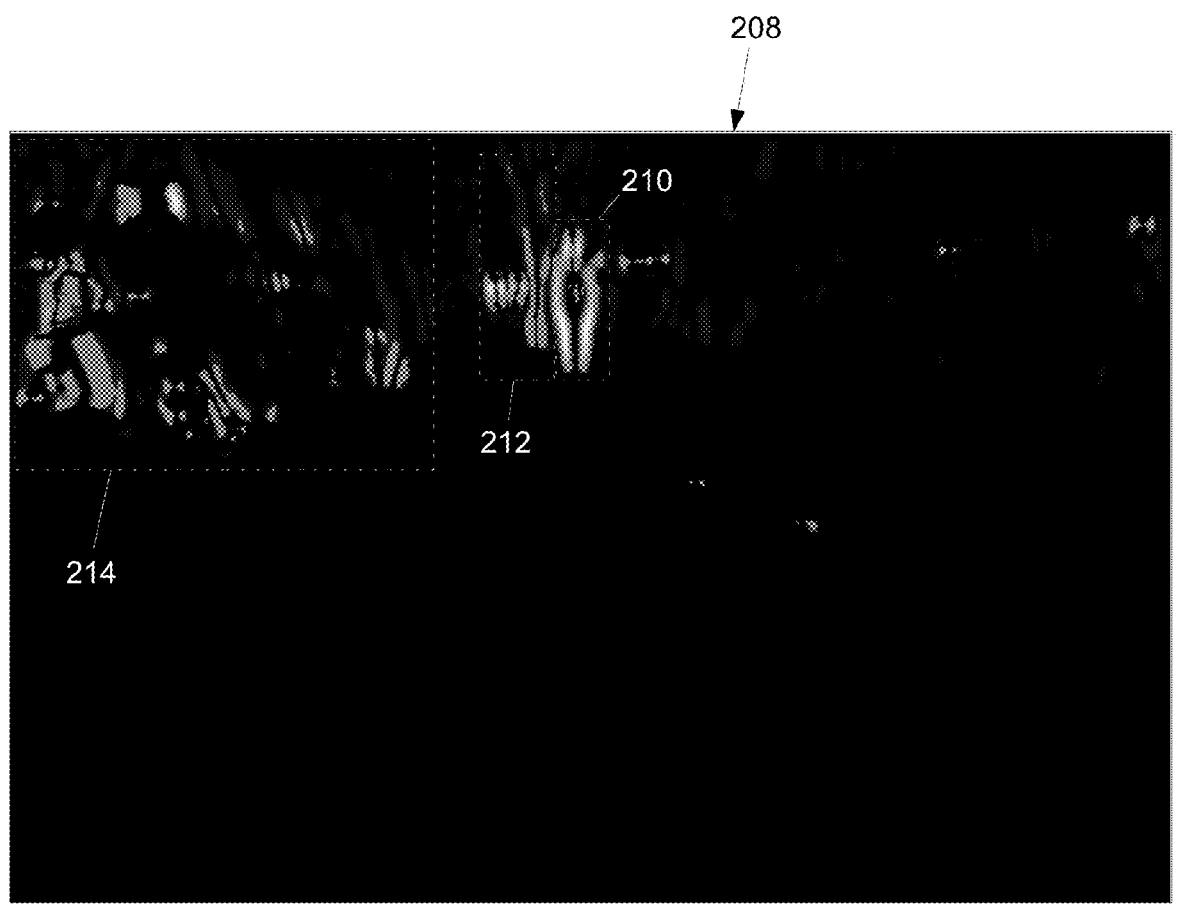
FIG. 2B is an example edge-image generated using the grayscale image of FIG. 2A.

Referring to FIG. 2B, an edge-image 208 corresponding to the image frame in FIG. 2A is shown. As seen in FIG. 2B, the edge-image includes respective outlines 210, 212, and 214 of the objects in the example image frame in FIG. 2A, in particular, of the pedestrian 202, the tree 204, and the van 206. Also seen in the edge-image of FIG. 2B, the outlines 210, 212, and 214 respectively depict the pedestrian, tree, and van as various shades of gray.

After the image segmentation module 114 generates the edge-image, the binary image creation module 116 creates a binary image (FIGS. 2C-E) from the edge-image. The binary image creation module 116, in this example, creates a binary image by comparing the value of each pixel in the edge-image to a predetermined threshold value. For example, if the edge-image pixel is above the threshold, then the binary image creation module 116 sets the corresponding binary image pixel to 1; if the edge-image pixel is below the threshold, then the binary image creation module 116 sets the corresponding binary image pixel to 0. The threshold value for generating the binary image may depend on various environmental factors such as, for example, the nature of the road surface, changes in illumination, etc. A suitable threshold for generating the binary image may be, for example, around fifty (50). The resulting binary image may include one or more clusters of binary data that correspond to one or more colored (e.g., white) blobs in the binary image (i.e., blobs) on a differently colored (e.g., black) background.

Figure 2C:
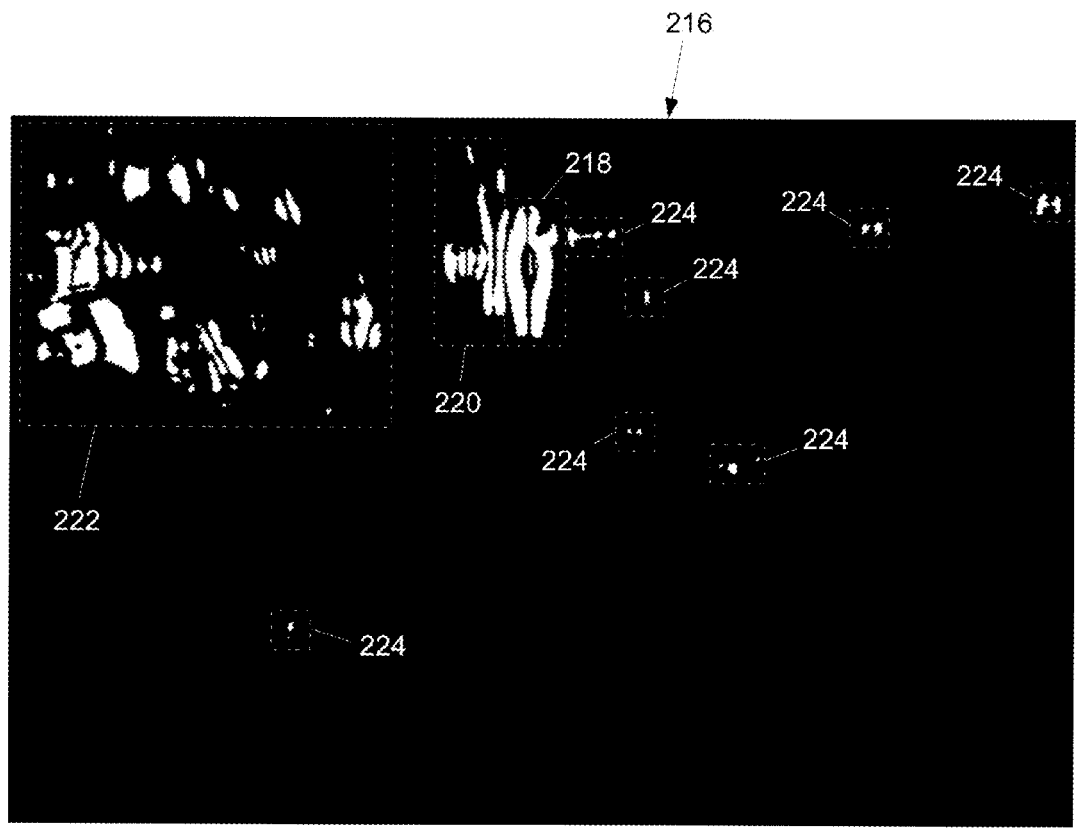
FIG. 2C is an example of a binary image generated using the edge-image of FIG. 2B.
Figure 2D:
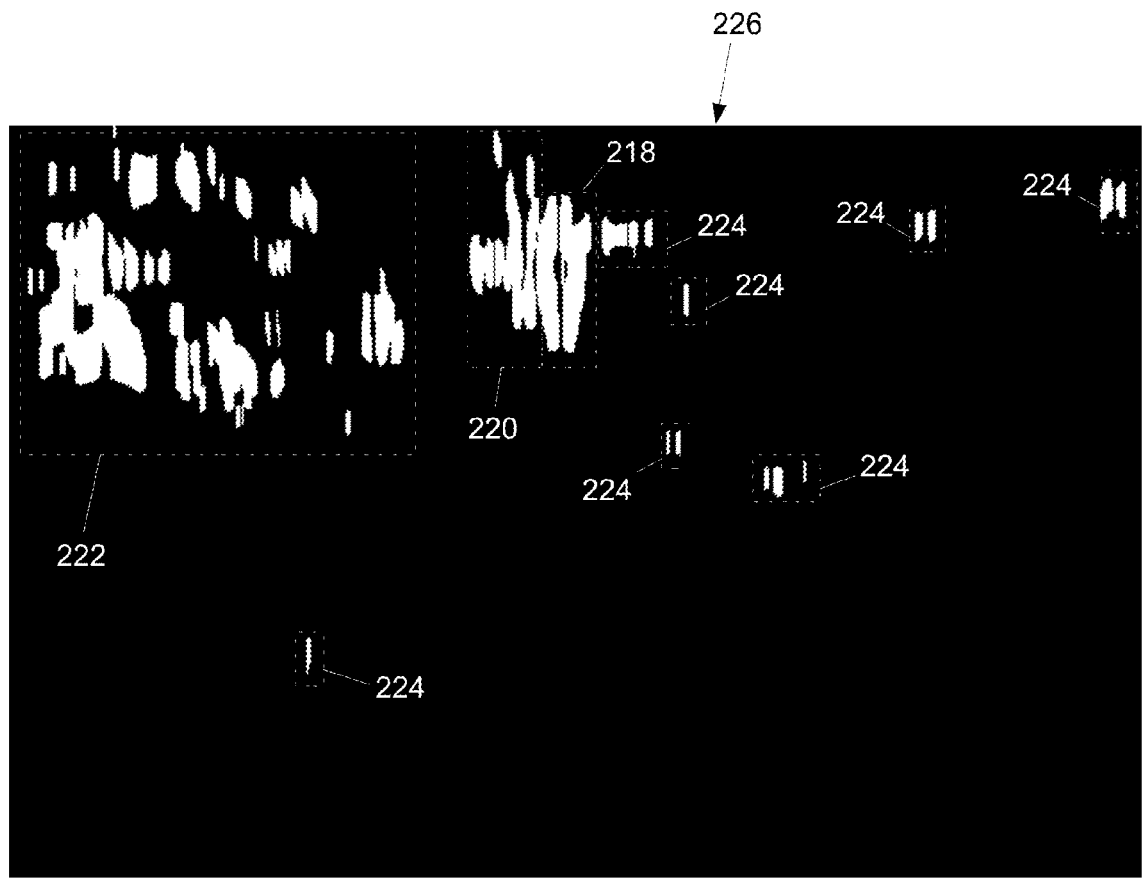
FIG. 2D is the binary image of FIG. 2C following image processing.
Figure 2E:
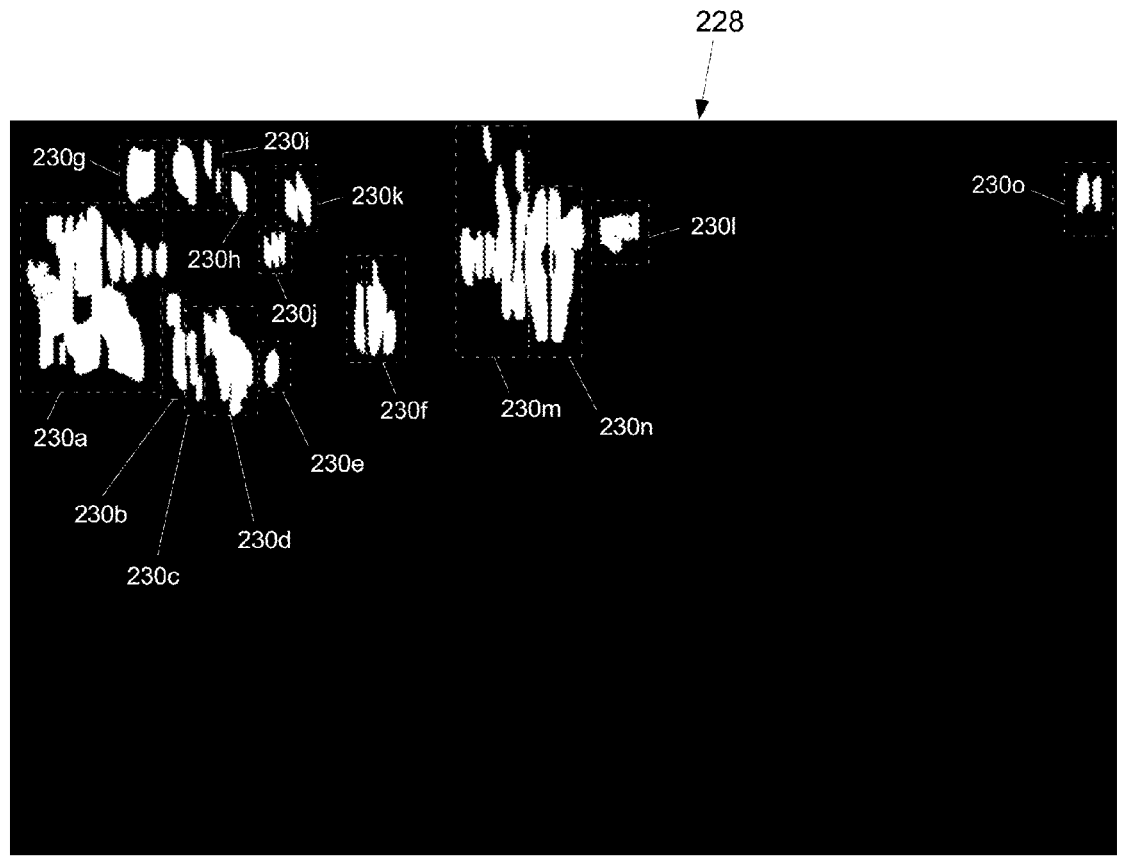
FIG. 2E is the binary image of FIG. 2D following additional image processing.

FIG. 2C is a binary image 216 that may be generated from the edge-image 208 shown in FIG. 2B using the approach discussed above. As seen in FIG. 2C, the binary image 208 includes various white blobs 218-224. For illustrative purposes, the blobs in the binary images of FIG. 2C-E are surrounded by dashed boxes. Some of the blobs 218 correspond to the pedestrian 202 in the image frame 200 of FIG. 2A; some of the blobs 220 correspond to the tree 204 in the image frame; and some of the blobs 222 correspond to the van 206 in the image frame. Also seen in FIG. 2C, the binary image 216 also includes isolated and relatively smaller blobs 224 that do not correspond to any of the objects in the image frame. These isolated blobs 224 may result from, for example, various shadows, lights, contours, road markings, etc., and do not correspond to potential obstacles in the path of the vehicle. These isolated blobs 224 may be considered as noise in the binary image 216, which the image processing unit 106 filters from the binary image as discussed further below.

The obstacle detection system includes a blob analysis module 118 that processes the binary image to extract and identify the blobs in the binary image. The binary image may contain relatively small and isolated blobs (such as the blobs 224 in FIG. 2C) as well as disconnected but adjacent blobs (such as, for example, the blobs for the pedestrian in FIG. 2C). Accordingly, the blob analysis module 118, in this example, performs morphological operations on the binary image to clean up the binary image. Morphological operations apply a structuring element to an input image to produce a similarly sized output image where the value of each pixel in the output image is based on a comparison of the corresponding pixel in the input image to its neighboring pixels.

Dilation and erosion are two morphological operations that the obstacle detection system, in this example, may use to process the binary image. Dilation expands blobs in the binary image by filling in holes and connecting disjointed blobs. If the blobs in the binary image are white on a black background, for example, then the dilation operation changes some of the black pixels to white. Erosion, on the other hand, shrinks blobs in the binary image by etching away at the boundaries of the blobs. If blobs in the binary image are white on a black background, then the erosion operation changes some of the white pixels to black. Dilation and erosion, as used in this example, may be accomplished by the following respective sequence of steps for white blobs on a black background.

For dilation, in this example, the blob analysis module slides a structuring element is slid across the image such that the origin (e.g., the center) of the structuring element is positioned at each pixel in the binary image. If the origin of the structuring element corresponds to a white pixel, then the blob analysis module 118 does not change the color of the pixel and moves the structuring element to the next pixel. If, however, the origin of the structuring element corresponds to a black pixel and the structuring element overlaps at least one white pixel, then the blob analysis module 118 changes all of the black pixels overlapped by the structuring element to white. In this way, the blob analysis module expands the white blobs in the binary image.

For erosion, in this example, the blob analysis module 118 also slides the structuring element across the image and positions the origin of the structuring element (e.g., the center) at each pixel in the binary image. Like dilation, if the origin of the structuring element corresponds to a white pixel in the binary image, then the blob analysis module 118 does not change the color of the pixel and moves the structuring element to the next pixel. If, however, the origin of the structuring element corresponds to a black pixel in the binary image, then the blob analysis module 118 changes all of the white pixels overlapped by the structuring element to black. In this way, the blob analysis module shrinks the white blobs in the binary image.

It will be understood that the dilation and erosion operations may be selectively customized by adjusting the size and shape of the structuring element, which determines the result of the morphological operation. In this example, a suitable structuring element may be a single column of 1's with the reference point, R, on top. For example,

R

1

-continued

1

1

1

The blob analysis module 118, in this example, may perform an erosion operation as part of the process to remove relatively small and isolated blobs from the binary image. The blob analysis module 118 may also perform a dilation operation to merge the disconnected but adjacent blobs in the binary image. In this example, the blob analysis module 118 first performs the dilation operation and then performs the erosion operation. FIG. 2D is a modified binary image 226 that shows the results of the dilation and erosion operations on the binary image 216 of FIG. 2C. As seen in FIG. 2D, many of the blobs 218-224 in the modified binary image 226 have expanded and merged together. In particular, many of the blobs 218-222 respectively associated with the pedestrian 202, tree 204, and van 206 in the image frame 200 of FIG. 2A have merged. Also seen in FIG. 2D, the modified binary image 226 still includes the isolated blobs 224 that are not associated with potential obstacles in the path of the vehicle.

More than one blob in the binary image may correspond to a single object in the image frame. For example, in the example binary image 226 shown in FIG. 2D, more than one blob respectively corresponds to the pedestrian, tree, and van. Accordingly, the blob analysis module 118 performs a connected component labeling operation (i.e., a "blob extraction" operation or a "blob discovery" operation) to group adjacent blobs that correspond to a single object in the image frame and label the grouped blobs as an object in the image frame. Connected component labeling scans the image and groups its pixels into components based on pixel connectivity. Pixel connectivity, in this example, due to the proximity of the pixels to one another or due to some other relationship between the pixels. Once the blob analysis module 118 has identified each pixel group as a component, each pixel may be labeled according to the component the pixel was assigned to. The blob analysis module 118 may label the pixels using, for example, an intensity value or a color value. In this way, the blob analysis module identifies one or more components in the binary image where each component may include one or more blobs.

In this example, the blob analysis module 118 labels the pixels of the binary image using an 8-connected pixel approach where pixels are connected horizontally, vertically, and diagonally (i.e., neighboring pixels that touch either an edge or corner of a pixel). 8-connected pixels to a pixel at (x, y) are pixels having the following coordinates: (x+1, y), (x−1, y), (x, y+1), (x, y−1), (x+1, y−1), (x+1, y+1), (x−1, y−1), and (x−1, y+1).

Following the connected component labeling operation, the blob analysis module 118 compares the size (i.e., total pixel area) of the component to a predetermined pixel area threshold, e.g., forty pixels by forty pixels (i.e., 40 px×40 px). The total pixel area for a component, in this example, equals the sum of the pixel areas for the blobs of the component. The blob analysis module removes from the binary image the blobs for any labeled components having a total pixel area below the pixel area threshold. The size of the pixel area threshold may depend on and correspond to the size of the objects in the image frame that are considered to be obstacles. For example, in some implementations, objects rising 25 centimeters (i.e., around 9.8 inches) above the road surface may be considered to be obstacles in the path of the vehicle.

The corresponding pixel area threshold may be determined based on this value. The blob analysis module 118 may remove blobs by, for example, setting the pixels of the blob to black. FIG. 2E is another modified binary image 228 that shows the results of the connected component labeling operation. In the example modified binary image 228 shown in FIG. 2E, the blob analysis module 118 has identified fifteen (15) different components 230a-o. In particular, the blob analysis module 118 has identified a component 230m for the tree and a component 230n for the pedestrian in the binary image 228. Also seen in FIG. 2E, isolated blobs 224 in the binary image 226 in FIG. 2D have been removed from the modified binary image 228 in FIG. 2E.

Figure 2F:
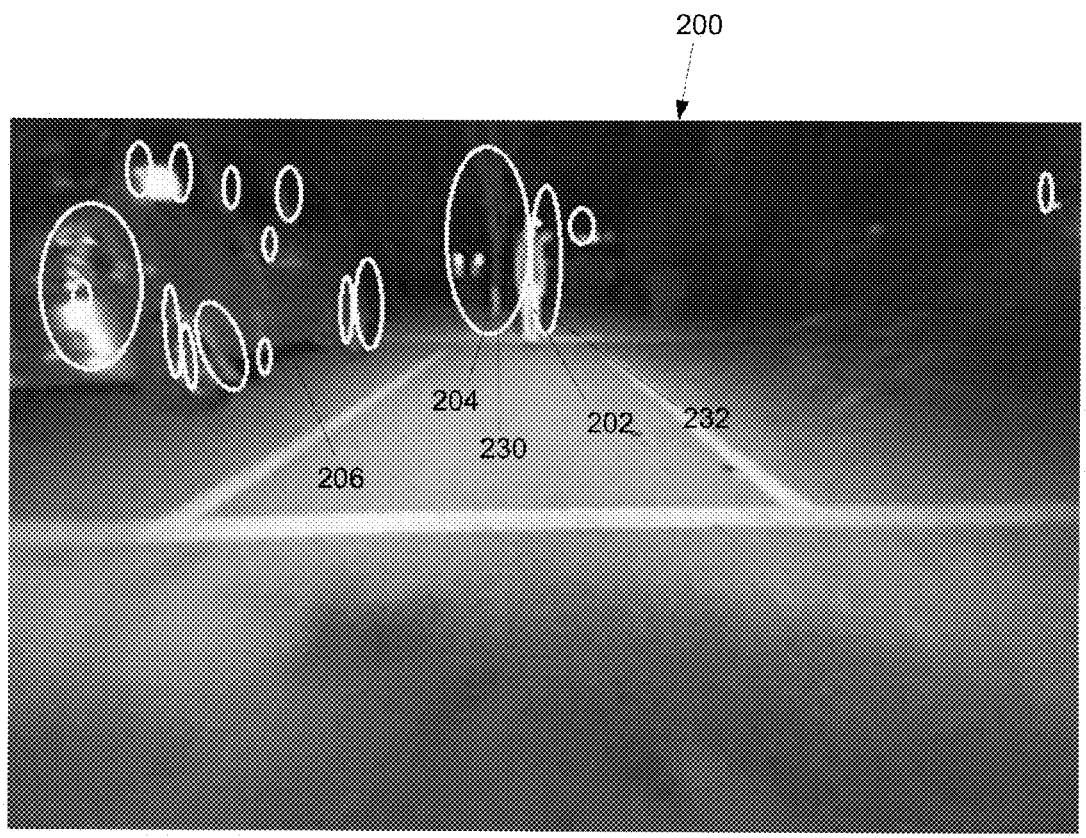
FIG. 2F is the grayscale image of FIG. 2A including ellipses for components identified in the image.

Once the blob analysis module 118 removes blobs below the size threshold, the blob analysis module determines an ellipse for each identified component in the binary image. The ellipse for each component, in this example, is the smallest ellipse that can completely enclose the contour of the blob or group of blobs corresponding to the component. Accordingly, one of the ellipse axes (e.g., the major axis) may correspond to the maximum length of the blob (or blob group) along the vertical axis of the blob, and the other ellipse axis (e.g., the minor axis) may correspond to the maximum width of the blob along the horizontal axis of the blob. Accordingly, the vertical axis of the blob corresponds to a vertical edge of the object in the image frame. FIG. 2F is the image frame 200 of FIG. 2A with ellipses 230-232 for the identified components added to the image. As seen in FIG. 2F, the image frame 200 includes an ellipse 230 for the tree 204 and an ellipse 232 for the pedestrian 202. Also seen in FIG. 2F, the image frame 200 includes various ellipses for various surface features of the van 206 and for ambient lights in the surrounding environment. Accordingly, some of the identified components do not correspond to potential obstacles in the path of the vehicle. The obstacle detection system 100 uses the ellipses for the identified components to determine which components correspond to true obstacles in the path of the vehicle as discussed further below.

The obstacle detection system 100, in this example, further includes an obstacle verification module 120 to identify true obstacles in the path of the vehicle. The obstacle verification module 120, in this example, generates a top-view image to identify which identified components in the image frame are obstacles in the path of the vehicle. The top-view image may also be referred to as a "bird view" image and is a transform of the image frame that rotates the perspective of the camera to look down on the image frame. The top-view image may be generated from an inverse perspective mapping (IPM) transformation of the image frame.

The obstacle verification module 120 identifies which objects in the image frame are obstacles in the path of the vehicle based on the top view image. The obstacle verification module 120 compares prolongations of the vertical edges of objects in the top-view image to the focus of the camera perspective used to generate the top-view image. In the top-view image, the vertical edges of the objects in the image frame are prolongated towards the focus. If the prolongation of a vertical edge passes near the focus, then obstacle verification module 120 identifies the object associated with that vertical edge as an obstacle in the path of the vehicle.

Figure 4A:
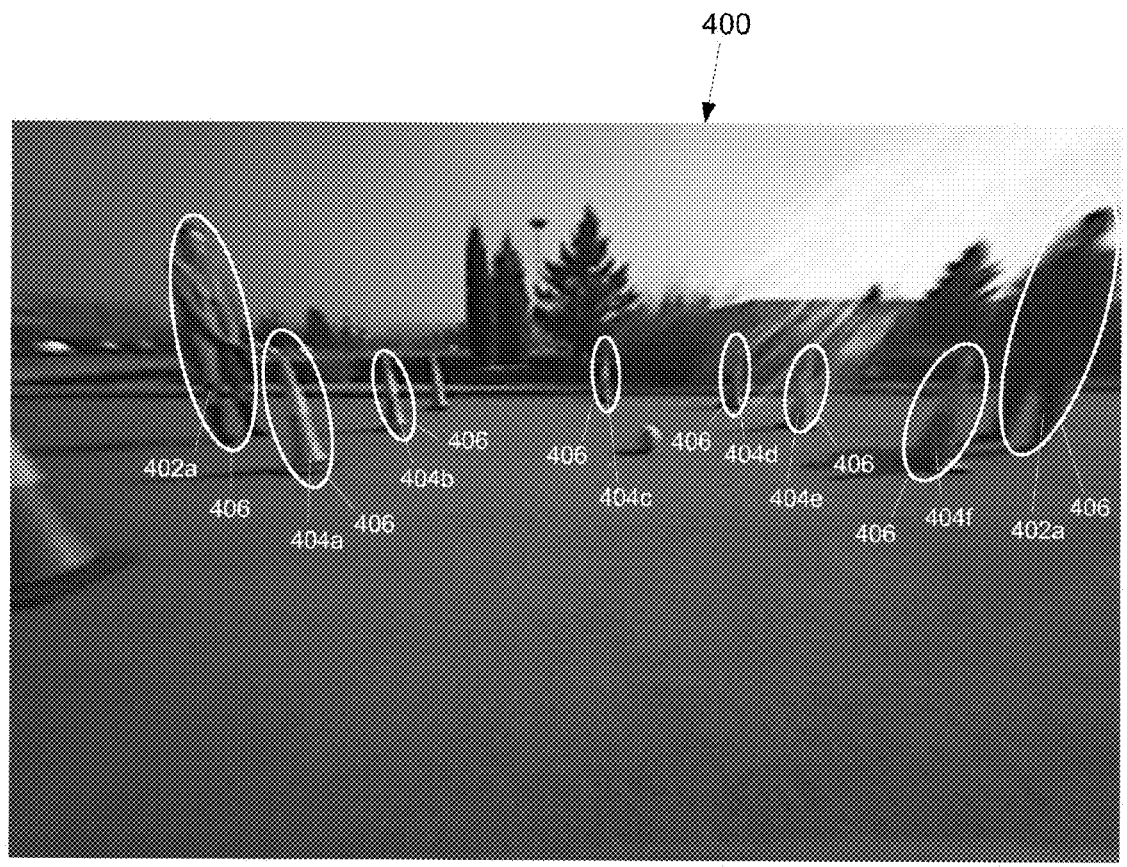
FIG. 4A is another example image of a path of a vehicle that includes ellipses for components identified in the image.
Figure 4B:
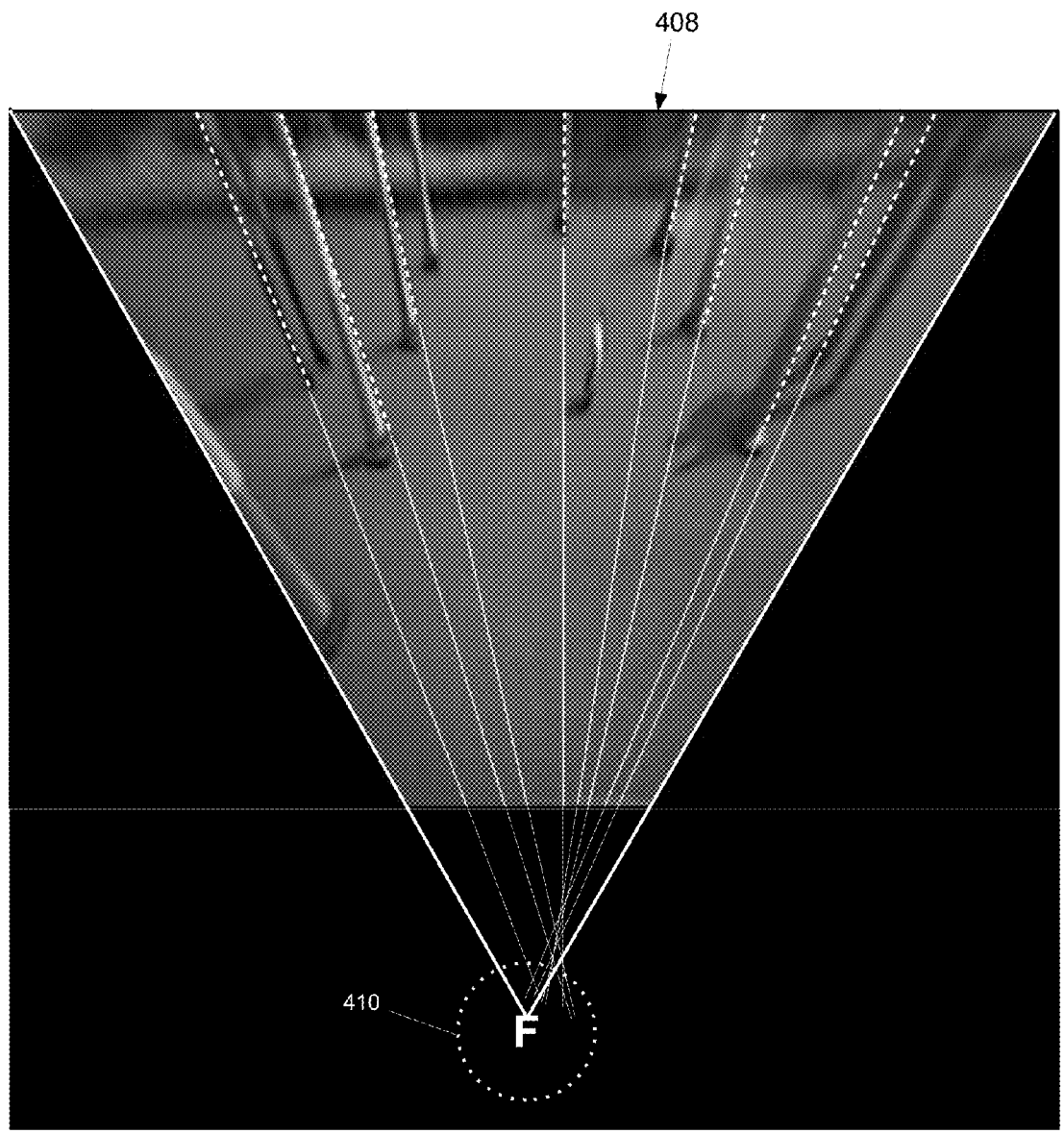
FIG. 4B is a top-view image generated using the example image of FIG. 4B.

Referring to FIG. 4A an example image frame 400 of a vehicle path is shown. As seen in FIG. 4A, various objects 402-404 have been identified following the image processing discussed above. The objects in this example include pedestrians 402a-b and traffic cones 404a-f, which rise up from the road surface and may be obstacles in the path of a vehicle. An obstacle detection system 100 has processed the image frame 400 to identify these objects 402-404 and has determined the ellipses 406 for these objects. In FIG. 4B a top-view image 408 of the image frame 400 in FIG. 4A is shown. As seen in FIG. 4B, the top-view image 408 projects away from the camera focus, F (i.e., the projection point of the camera). Also, the objects 402-404 identified in the image frame 400 of FIG. 4A are elongated in the top-view image 408 of FIG. 4B. The vertical edges for the identified objects 402-404 are depicted in FIG. 4B by the dashed white lines. The projections for the vertical edges are depicted in FIG. 4B by the solid white lines extending from the vertical edges. The projections for the vertical edges of the objects project toward the focus, F. Theoretically, the projections for the vertical edges of the objects will intersect at the focus, F. In practice, however, the projections may not intersect exactly at the focus, F, but rather within a small interval around the focus. Accordingly, the obstacle verification module 120 defines an area 410 around the focus to determine whether an object in the image frame is an obstacle in the path of the vehicle. If a projection of a vertical edge of an object falls into the defined area 410 around the focus, then the obstacle verification module 120 determines that the object associated with the projection is an obstacle in the path of the vehicle. The interval may be, for example, a circle 410 positioned around the focus, F, such that the focus is at the center of the circle as shown by way of example in FIG. 4B. The size of the area 410 may depend on, for example, the intrinsic parameters of the camera and may be determined accordingly. A suitable radius for the circle 410 may be, for example, ten pixels. As seen in the example top-view image 408 of FIG. 4B, all of the projections for the objects in the image fall into the area 410 defined around the focus, F. Accordingly, the obstacle verification module 120 may determine that these objects are true obstacles in the path of the vehicle.

In response to identification of an object as an obstacle in the path of the vehicle, the obstacle detection system 100, in this example, generates a warning signal. The obstacle detection system 100 may transmit the warning signal to an output device 104 that may generate an alarm warning the driver of the vehicle to the presence of the obstacle. The alarm may be, for example, an audible voice alarm. Other types of alarms may be selectively employed to warn and alert the driver to the presence of an obstacle in the path of the vehicle such as, for example, flashing lights, visual displays, and other visual indicators as well as vibrations or other tactile indicators.

Figure 5:
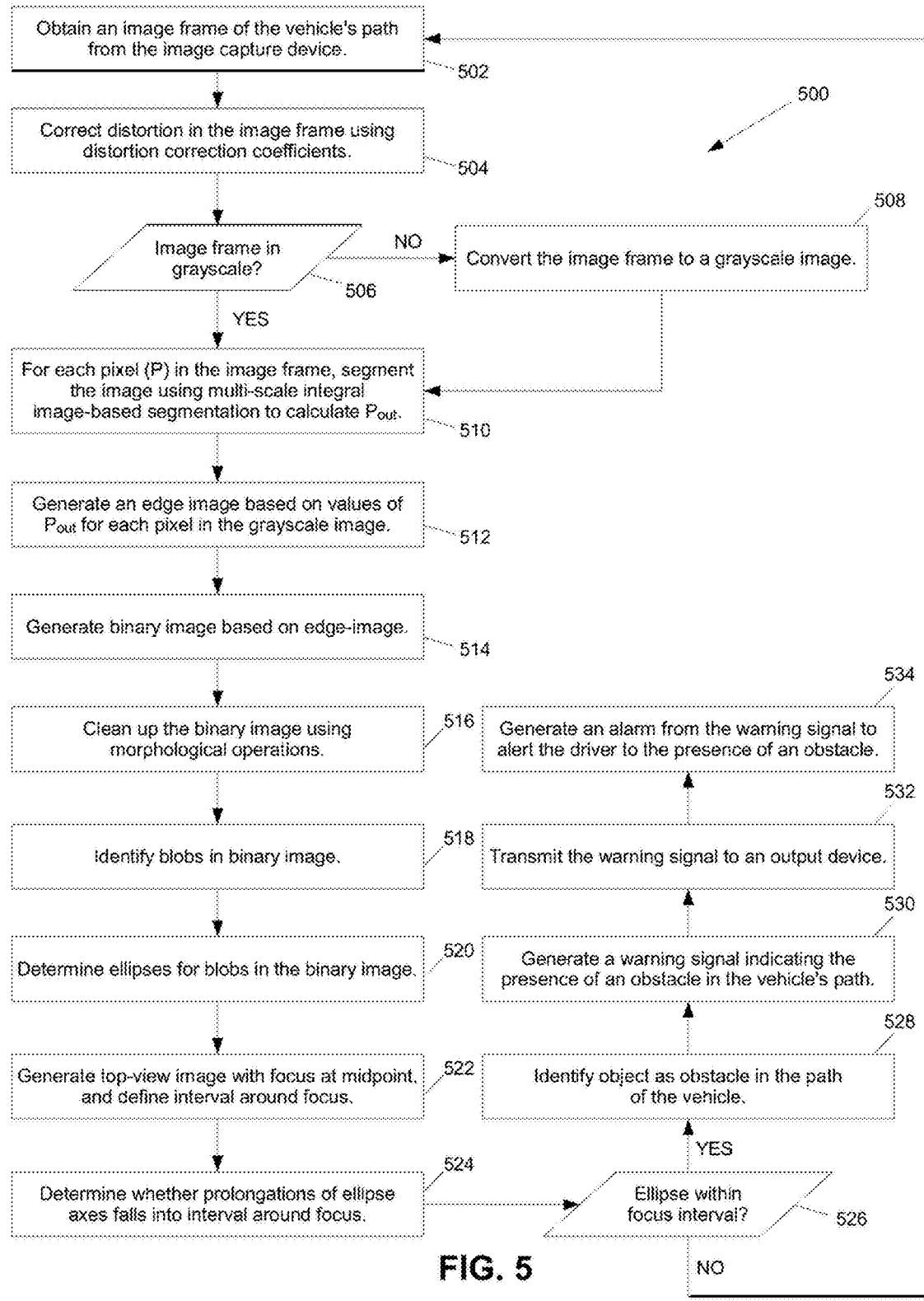
FIG. 5 is a flowchart of example method steps for detecting obstacles in the path of a vehicle.

Referring now to FIG. 5, a flowchart 500 of example method steps for detecting obstacles in the path of a vehicle is shown. An image of the path of a vehicle is obtained from an image capture device (step 502). The image may depict the path in front of the vehicle if the vehicle is traveling forward, or the image may depict the path behind the vehicle if the image is traveling in reverse. Distortion in the image is corrected using, for example, distortion correction coefficients obtained via a camera calibration method (step 504). If the image frame is not in grayscale (step 506), then the image frame is converted into a grayscale image (step 508). For each pixel in the grayscale image, a multi-scale integral image-based segmentation is performed to calculate a pixel value, $P_{out}$, for a corresponding pixel in an edge-image (step 510). Example method steps for performing the multi-scale integral image-based segmentation of the grayscale image will be discussed further below in reference to FIG. 6.

An edge-image is generated based on the values of $P_{out}$ (step 512). A binary image is then generated based on the edge-image (step 514). The binary image has only two possible values for the pixels of the binary image (e.g., 0 and 1) corresponding to only two colors in the binary image (e.g., black and white). Morphological operations are performed to clean up the binary image (step 516). For example, erosion may be used to remove relatively small and isolated foreground regions in the binary image, and dilation may be used to merge adjacent and proximal foreground regions in the binary image. Following the cleanup step, the binary image may include one or more components. Connected component labeling may be used to merge close components, and components below a predetermined size threshold may be removed. The remaining components in the binary image may be identified as blobs in the binary image (step 518).

An ellipse for each blob is then determined (step 520). The ellipse for a blob, in this example, is the smallest ellipse that can completely enclose the contours of the blob. A top-view image of the image frame is then determined along with corresponding prolongations of the ellipses for the blobs in the binary image; the focus of the image is set at the midpoint, and an interval around the focus is determined based on a predetermined threshold (step 522). It is then determined whether the respective prolongations of the major axis of the ellipses falls within the interval around the focus of the top-view image (step 524). If a major axis of an ellipse falls into the interval around the focus (step 526), then the object in the image frame corresponding to the ellipse is identified as an obstacle in the path of the vehicle (step 528). In response to the determination that an object in the image frame is an obstacle in the path of the vehicle, a warning signal is generated that indicates the presence of an obstacle in the path of the vehicle (step 530). The warning signal may be transmitted to an output device, e.g., and audio device (step 532). In response to receipt of the warning signal, the output device may generate an alarm—e.g., an audio alarm—that warns and alerts the driver to the presence of the obstacle in the path of the vehicle (step 534). The driver, in response to perceiving the alarm, may then take precautions to avoid the obstacle in the path of the vehicle. If it is determined that an object is not in the path of the vehicle, then the obstacle detection process begins again by obtaining a new image of the path in front of the vehicle at step 502.

Figure 6:
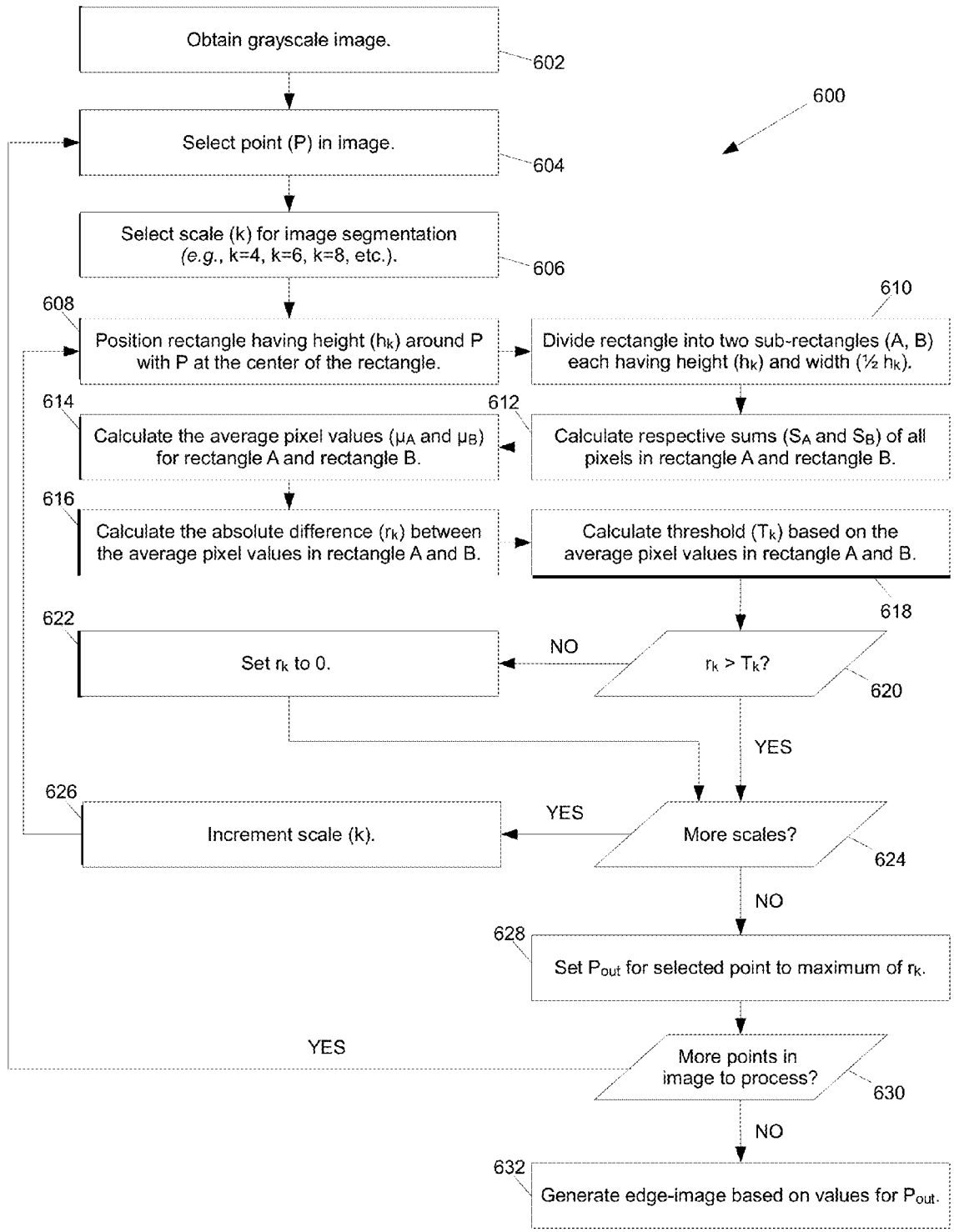
FIG. 6 is a flowchart of example method steps for a multi-scale integral image-based segmentation process.

Referring now to FIG. 6, a flowchart of example method steps for performing a multi-scale integral image-based segmentation is shown. The multi-scale integral image-based segmentation is used to generate the edge-image for the obstacle detection process. A grayscale image frame that depicts the path of the vehicle is obtained (step 602). A point, P, in the grayscale image frame is selected for processing (step 604). A desired scale, k, is selected for the integral-image based segmentation (step 606). In this example, three scales are used to perforin the integral image-based segmentation: k=4, k=6, and k=8. As discussed above, the scale, k, corresponds to the height and width, $h_k$, of the rectangle used to perform the segmentation of the grayscale image.

A rectangle having a height and width, $h_k$, is positioned around the selected point P with P at the center of the rectangle (step 608). The height and width of the rectangle corresponds to the currently selected scale, k. Thus, where, for example, k=4, the height and width of the rectangle is, for example, 4 pixels×4 pixels. The rectangle is then divided into two sub-rectangles—rectangle A and rectangle B—each having a height, $h_k$, and a width, $½h_k$ (step 610). The sum of the pixels values ($S_A$ and $S_B$) in rectangle A and rectangle B are respectively determined (step 612) as well as the average pixel value ($\mu_A$ and $\mu_B$) for rectangle A and rectangle B respectively (step 614). The absolute difference in average pixel value, $r_k$, is determined (step 616) as well as a threshold, $T_k$, based on the average pixel values for rectangle A and rectangle B (step 618). These values may be determined using equations 1-2 and equations 8-11 set forth above. If $r_k$ is less than $T_k$ (step 620), then $r_k$ is set to zero (step 622).

Steps 608-620 are performed for each point P in the grayscale image at the desired scales (e.g., 4, 6, and 8). Accordingly, if there are more scales (step 624) at which to process the image, then the scale is incremented—e.g., from k=4 to k=6—and a rectangle having a height and width at the newly incremented scale, k, is positioned around point P (step 626) and steps 608-624 are repeated. If the point P in the grayscale image has been processed at each desired scale—e.g., k=4, k=6, and k=8—then $P_{out}$ is determined based on the values for $r_k$ at each scale. In this example, $P_{out}$ is set to the maximum value of $r_k$—e.g., the maximum of $r_4$, $r_6$, and $r_8$ (step 628). As discussed above, $P_{out}$ is the value for the pixel in the edge-image that corresponds to the currently selected point P. If there are more points in the grayscale image to process (step 630), then a new point P in the grayscale image is selected for multi-scale processing (step 604) and steps 606-630 are repeated for the newly selected point P. If all points in the grayscale image have been processed, however, then an edge-image is generated (step 632) based on the respective values for $P_{out}$.

It will be understood and appreciated that one or more of the processes, sub-processes, and process steps described in connection with FIGS. 1 and 5-6 may be performed by hardware, software, or a combination of hardware and software on one or more electronic or digitally-controlled devices. The software may reside in a software memory (not shown) in a suitable electronic processing component or system such as, for example, one or more of the functional systems, devices, components, modules, or sub-modules schematically depicted in FIG. 1. The software memory may include an ordered listing of executable instructions for implementing logical functions (that is, "logic" that may be implemented in digital form such as digital circuitry or source code, or in analog form such as analog source such as an analog electrical, sound, or video signal). The instructions may be executed within a processing module, which includes, for example, one or more microprocessors, general purpose processors, combinations of processors, digital signal processors (DSPs), field programmable gate arrays (FPGAs), or application-specific integrated circuits (ASICs). Further, the schematic diagrams describe a logical division of functions having physical (hardware and/or software) implementations that are not limited by architecture or the physical layout of the functions. The example systems described in this application may be implemented in a variety of configurations and operate as hardware/software components in a single hardware/software unit, or in separate hardware/software units.

The executable instructions may be implemented as a computer program product having instructions stored therein which, when executed by a processing module of an electronic system (e.g., an obstacle detection system 10 in FIG. 1), direct the electronic system to carry out the instructions. The computer program product may be selectively embodied in any non-transitory computer-readable storage medium for use by or in connection with an instruction execution system, apparatus, or device, such as a electronic computer-based system, processor-containing system, or other system that may selectively fetch the instructions from the instruction execution system, apparatus, or device and execute the instructions. In the context of this document, computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access memory (electronic); a read-only memory (electronic); an erasable programmable read only memory such as, for example, Flash memory (electronic); a compact disc memory such as, for example, CD-ROM, CD-R, CD-RW (optical); and digital versatile disc memory, i.e., DVD (optical). Note that the non-transitory computer-readable storage medium may even be paper or another suitable medium upon which the program is printed, as the program can be electronically captured via, for instance, optical scanning of the paper or other medium, then compiled, interpreted, or otherwise processed in a suitable manner if necessary, and then stored in a computer memory or machine memory.

It will also be understood that the term "in signal communication" as used in this document means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electro-chemical, optical, wired, or wireless connections. The signal paths may also include additional systems, devices, components, modules, or sub-modules between the first and second system, device, component, module, or sub-module.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A computer-implemented method of detecting objects in a path of a vehicle comprising:
    obtaining an image frame that depicts the path of the vehicle;
    generating an edge-image corresponding to the image frame;
    generating a binary image corresponding to the edge-image;
    identifying one or more blobs containing one or more components in the binary image that respectively correspond to one or more objects in the image frame;
    determining a contour for a component from among the one or more components such that a size of the contour corresponds to a total pixel area of the component; and
    determining that an object, corresponding to the component in the image frame, is an obstacle in the path of the vehicle based on at least an edge of the determined contour projecting towards a focus of the image frame.

2. The computer-implemented method of claim 1 further comprising: generating a warning signal in response to the determination that the obstacle is in the path of the vehicle such that receipt of the warning signal at an output device causes the output device to output an alarm.

3. The computer-implemented method of claim 1 where the image frame is a color image frame and the method further comprising: generating a grayscale image frame corresponding to the color image frame.

4. The computer-implemented method of claim 1 further comprising: performing a multi-scale integral image-based segmentation of the image frame to generate the edge-image.

5. The computer-implemented method of claim 4 where the edge-image comprises a grid of pixels, individual pixels having a pixel value and the method further comprising: comparing the pixel value of the individual pixels in the edge-image to a predetermined pixel value threshold to generate the binary image.

6. The computer-implemented method of claim 5 further comprising:
    performing an erosion morphological operation on the binary image to shrink at least one of the one or more blobs in the binary image; and
    performing a dilation morphological operation on the binary image to expand at least one of the one or more blobs in the binary image.

7. The computer-implemented method of claim 1 where the binary image comprises a grid of pixels, the method further comprising:
    comparing the total pixel area of each component in the binary image to a predetermined pixel area threshold; and
    in response to a determination that one or more components have a corresponding total pixel area smaller than the predetermined pixel area threshold, removing the respective blobs of the one or more components from the binary image.

8. The computer-implemented method of claim 1, where the contour is formed as an ellipse, and an axis of the ellipse corresponds to the edge, the computer-implemented method further comprising:
    generating a top-view image corresponding to the image frame;
    determining prolongation of the axis of the ellipse towards the focus in the top-view image;
    determining that the prolongation passes through a predetermined area around the focus; and
    in response to the prolongation passing through the predetermined area, determining that the object in the image frame corresponding to the component for the determined ellipse is an obstacle in the path of the vehicle.

9. The computer-implemented method of claim 1 further comprising: adjusting the image frame to correct for lens distortion in the image frame.

10. A system for detecting objects in a path of a vehicle comprising:
    an image segmentation module configured to generate an edge-image corresponding to an image frame, the image frame depicts the path of the vehicle;
    a binary image creation module configured to generate a binary image corresponding to the edge-image;
    a blob analysis module configured to identify a component corresponding to one or more blobs in the binary image, the component further corresponds to an object in the image frame;
    the blob analysis module further configured to determine an ellipse enclosing the identified component; and
    an obstacle verification module configured to classify the object corresponding to the identified component as in the image frame an obstacle in the path of the vehicle based on a prolongation of the ellipse passing through a predetermined area around a focus of the image frame.

11. The system of claim 10 where the system is configured to generate a warning signal in response to the determination that the obstacle is in the path of the vehicle such that receipt of the warning signal at an output device causes the output device to output an alarm.

12. The system of claim 10 where the image frame is a color image frame and the system further comprising: a gray-scale transformation module configured to generate a gray-scale image frame corresponding to the color image frame.

13. The system of claim 10 where the image segmentation module is configured to perform a multi-scale integral image-based segmentation of the image frame to generate the edge-image.

14. The system of claim 13 where:
the edge-image comprises a grid of pixels, individual pixels having a pixel value; and
the binary image creation module is configured to compare the pixel value of the individual pixels in the edge-image to a predetermined pixel value threshold to generate the binary image.

15. The system of claim 14 where:
the blob analysis module is further configured to perform an erosion morphological operation on the binary image to shrink at least one of the one or more blobs in the binary image; and
the blob analysis module is further configured to perform a dilation morphological operation on the binary image to expand at least one of the one or more blobs in the binary image.

16. The system of claim 10 where a size of the ellipse corresponds to a total pixel area of the component, and where:
the binary image comprises a grid of pixels;
the blob analysis module configured to compare the total pixel area of the component in the binary image to a predetermined pixel area threshold; and
in response to the total pixel area being smaller than the predetermined pixel area threshold, the blob analysis module removes the one or more blobs corresponding to the component from the binary image.

17. The system of claim 10 where:
the obstacle verification module is configured to generate a top-view image corresponding to the image frame;
the obstacle verification module is configured to determine prolongation of an axis of the ellipse towards the focus in the top-view image; and
the obstacle verification module further configured to determine that the prolongation passes through the predetermined area around the focus.

18. The system of claim 10 further comprising a distortion correction module that adjusts the image frame to correct for lens distortion in the image frame.

19. A non-transitory computer readable storage medium comprising instructions executed by a processor, the computer readable storage medium comprising:
instructions to receive an image frame of a path of a vehicle;
instructions to identify a component in a binary image corresponding to one or more blobs detected in the binary image, where the binary image corresponds to the image frame, and the component corresponds to an object in the image frame;
instructions to determine a focus of the image frame;
instructions to classify the object as an obstacle in the path of the vehicle in response to at least an elongated edge of the identified component passing through a predetermined area around the focus.

20. The non-transitory computer readable storage medium of claim 19, where the edge of the identified component is a vertical edge of an enclosing contour of the identified component.

* * * * *